(12) United States Patent
Monereau et al.

(10) Patent No.: US 7,255,727 B2
(45) Date of Patent: Aug. 14, 2007

(54) METHOD FOR TREATING AT LEAST ONE FEED GAS MIXTURE BY PRESSURE SWING ADSORPTION

(75) Inventors: Christian Monereau, Paris (FR); Guillaume De Souza, Issy les Moulineaux (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 448 days.

(21) Appl. No.: 10/517,228

(22) PCT Filed: Jun. 17, 2003

(86) PCT No.: PCT/FR03/01828

§ 371 (c)(1), (2), (4) Date: Dec. 7, 2004

(87) PCT Pub. No.: WO04/000441

PCT Pub. Date: Dec. 31, 2003

(65) Prior Publication Data

US 2005/0229782 A1 Oct. 20, 2005

(30) Foreign Application Priority Data

Jun. 19, 2002 (FR) .................................. 02 07568

(51) Int. Cl.
*B01D 53/047* (2006.01)
*C01B 3/56* (2006.01)

(52) U.S. Cl. .............................. 95/96; 96/109; 96/114; 96/121

(58) Field of Classification Search ............ 95/96–103; 96/109, 110, 111, 112, 113, 114, 115, 121
See application file for complete search history.

(56) References Cited

U.S. PATENT DOCUMENTS

| 5,258,056 | A | 11/1993 | Shirley et al. |
| 5,407,465 | A | 4/1995 | Schaub et al. |
| 6,261,343 | B1 * | 7/2001 | Golden et al. ............... 95/96 |
| 6,270,556 | B1 | 8/2001 | Rouge et al. |
| 6,277,174 | B1 * | 8/2001 | Neu et al. ................... 95/12 |

(Continued)

FOREIGN PATENT DOCUMENTS

EP 0 375 220 6/1990

(Continued)

OTHER PUBLICATIONS

International Search Report for PCT/FR03/01828.

*Primary Examiner*—Frank M. Lawrence
(74) *Attorney, Agent, or Firm*—Elwood L. Haynes (57) ABSTRACT

The invention concerns a treatment method which consists in using a pressure swing adsorption treatment unit (16) and causing said treatment unit (16) to follow a nominal operating cycle, based on nominal operating conditions and in order to ensure minimal performances of the feed gas treatment. It further consists in providing at least a preprogrammed auxiliary operating cycle, different from the nominal cycle, and, when the operating conditions differ from the nominal conditions to the extent that the treatment unit (16) no longer achieves its minimal performances, in imposing to the treatment unit (16) to follow the or one of the auxiliary cycles.

11 Claims, 3 Drawing Sheets

U.S. PATENT DOCUMENTS

| | | | |
|---|---|---|---|
| 6,315,818 B1 * | 11/2001 | Monereau | 95/98 |
| 6,322,611 B1 | 11/2001 | Engler | |
| 6,447,582 B1 * | 9/2002 | de Souza | 96/121 |
| 2002/0121193 A1 * | 9/2002 | Baksh et al. | 95/96 |

FOREIGN PATENT DOCUMENTS

| | | |
|---|---|---|
| EP | 0 458 350 | 11/1991 |
| EP | 0 925 821 | 6/1999 |
| EP | 1 018 488 | 7/2000 |
| FR | 2 785 554 | 5/2000 |

* cited by examiner

METHOD FOR TREATING AT LEAST ONE FEED GAS MIXTURE BY PRESSURE SWING ADSORPTION

This application is a 371 of International PCT Application PCT/FR03/01828, filed Jun. 17, 2003.

BACKGROUND

The present invention relates to a method for treating a gas by adsorption, of the type in which a PSA (pressure swing adsorption) treatment unit is used and in which said treatment unit is made to follow a nominal operating cycle defined according to the nominal operating conditions and for the purpose of guaranteeing minimum treatment performance levels.

PSA units are widely used for the separation and/or purification of feed gases, especially in fields such as the production of hydrogen and carbon dioxide, drying, separation of the constituents of air, etc.

"$H_2$-PSA" units, which produce substantially pure hydrogen, are used with feed gases of varied origin, these being formed for example from gases resulting from steam reforming, from a refinery or from a coke oven, or else formed from waste gases coming from ethylene or styrene production units, or from cryogenic hydrogen-carbon monoxide separation units.

In general, a PSA unit consists of several adsorbers that follow, shifted in time, an operating cycle, hereafter called for convenience a "PSA cycle", which is distributed uniformly over as many phase times as there are adsorbers in operation and which is formed from basic steps, namely the following steps:
  adsorption at substantially a high pressure of the cycle;
  cocurrent depressurization, generally from the high pressure of the cycle;
  countercurrent depressurization, generally down to the low pressure of the cycle;
  elution at substantially a low pressure of the cycle; and
  repressurization from the low pressure of the cycle up to the high pressure of the cycle.

Hereafter, the description relates to the operation of a PSA unit in the steady state, that is to say away from the transient periods during which the unit is started up or shut down, which generally correspond to special cycles set up for this purpose.

The main operating constraint of a PSA unit in the steady state consists of the purity level of the product. Under this operating condition, the treatment performance levels of a PSA unit are then generally optimized, either to maximize the extraction efficiency (amount of gas produced/amount of this gas present in the feed gas), or to minimize the energy consumed.

What is obtained is as it were a nominal operating cycle of the PSA unit, defined directly according to the nominal operating conditions (flow rate of the feed gas, flow rate of the treated gas, composition of the feed gas, operating temperature of the unit, etc.).

When the operating conditions depart only slightly from the nominal conditions, it has been proposed in the past to regulate the operation of the PSA unit by adjusting one or more parameters of the nominal cycle so as to guarantee that the treatment performance levels remain above predefined minimum limits. Two regulations employing this approach are:

"capacity" regulation, which consists in modifying the duration of the phase time of the cycle according to the variation in the feed gas flow rate; and "purity control" regulation, which consists in modifying this phase time according to the purity of the gas treated.

However, when the operating conditions depart greatly from the nominal operating conditions, the operation of the PSA unit is degraded, the expected performance levels no longer being achieved.

SUMMARY

It is an object of the present invention to propose a treatment method of the type defined above, and especially a method for producing hydrogen, which guarantees continuity of operation of a PSA unit when there is a sudden and/or large change in the operating conditions of the unit, especially those relating to the feed gas, and more precisely to its composition, its pressure, its flow rate and/or its temperature.

For this purpose, one subject of the invention is a treatment method of the aforementioned type, in which at least one preprogrammed auxiliary operating cycle, different from the nominal cycle, is used, and when the operating conditions differ from the nominal conditions to the point that the treatment unit no longer achieves its minimum performance levels, the treatment unit is made to follow the or one of the auxiliary cycles.

According to other features of this method, taken individually or in any technically possible combination:
  the composition of the feed gas is an operating condition;
  the pressure of the feed gas and the pressure of a waste gas output by the treatment unit are operating conditions;
  the temperature of the feed gas is an operating condition;
  the flow rate of the feed gas is an operating condition;
  several preprogrammed intermediate steps are used for passing from one cycle the other from among the nominal cycle and auxiliary cycle(s);
  the nominal operating cycle is identified by a triplet X.Y.Z, where X denotes the number of active adsorbers of the treatment unit, Y denotes the number of adsorbers in simultaneous adsorption and Z denotes the number of pressure balancing steps carried out on said nominal cycle, and at least one of the number X' of active adsorbers, of the number Y' of adsorbers in simultaneous adsorption and of the number Z' of pressure balancing steps carried out on the or each auxiliary cycle is different from the corresponding number of the nominal cycle;
  one of the pressure balancing steps is a partial balancing step so that at least one of the numbers Z and Z' is not an integer;
  the nominal cycle and the or each auxiliary cycle include at least one adsorption step at a high pressure of the cycle, a purge step consisting of a countercurrent depressurization down to the low pressure of the cycle, an elution step at said low pressure, and a repressurization step up to said high pressure, the (duration of the adsorption phase)/(duration of the purge and elution steps) ratio being substantially between 0.5 and 2 for each of the cycles; and
  the treatment unit is a hydrogen production unit.

The subject of the invention is also a combined hydrogen/carbon monoxide production plant comprising:
  at least one reactor for the production of a syngas;
  at least one unit for the decarbonization of the syngas;

at least one unit for the purification of the decarbonized gas;

at least one cryogenic unit for the production of carbon monoxide, connected to one outlet of the purification unit; and at least one unit for treatment by pressure swing adsorption, connected to another outlet of the purification unit, characterized in that said pressure swing adsorption treatment unit is capable of implementing the method as defined above.

The purification unit comprises at least two adsorbent bottles so as to allow continuous operation of the plant. The pressure swing adsorption treatment unit comprises a variable number of adsorbers, depending on the flow rates and/or the hydrogen yield required—the number of adsorbers may thus vary from four to sixteen.

BRIEF DESCRIPTION OF THE DRAWINGS

The invention will be more clearly understood on reading the following description, given solely by way of example and with reference to the drawings in which.

DETAILED DESCRIPTION OF THE PREFERRED EMBODIMENTS

Figure 1:
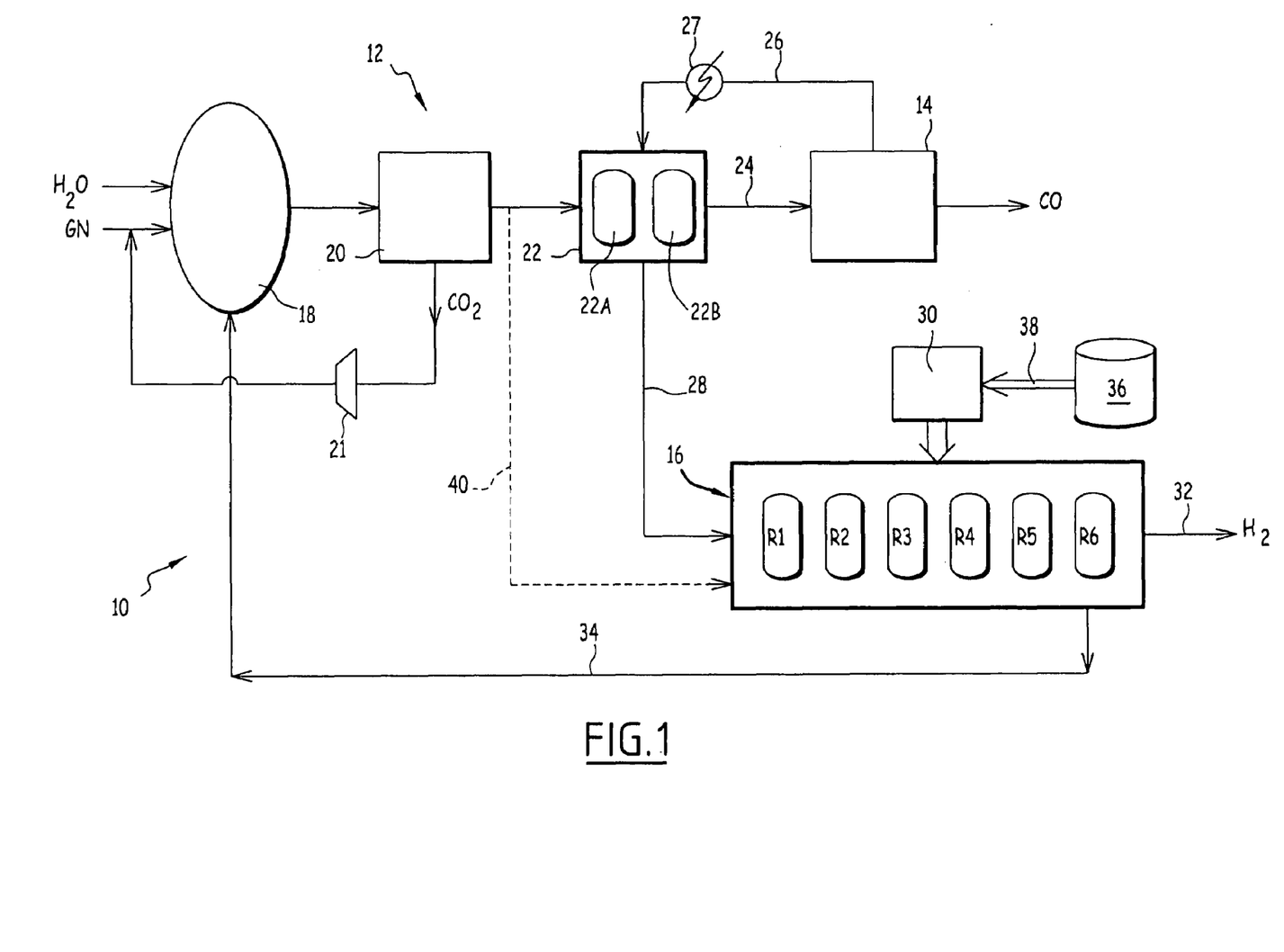
FIG. 1 is a schematic view of a combined hydrogen/carbon monoxide production plant comprising a PSA unit implementing a method according to the invention.

FIG. 1 shows a plant 10 for the combined production of hydrogen and carbon monoxide from both water and a feed gas consisting of natural gas NG. The plant includes a natural gas treatment line 12, downstream of which both a cryogenic unit 14 for production of carbon monoxide (CO) and a unit 16 for production of hydrogen ($H_2$) are connected, explained in detail later.

The treatment line 12 comprises, from upstream to downstream:

a syngas production reactor 18, in which the natural gas is desulfurized, heavy hydrocarbons are decomposed into methane and carbon dioxide, and the methane is converted into a hydrogen-rich syngas containing carbon monoxide and carbon dioxide;

an amine-scrubbing decarbonization unit 20, a carbon dioxide-rich waste stream of which is recompressed at 21 and recycled upstream of the reactor 18; and a purification unit 22 for arresting almost all of the water and greatly lowering the carbon dioxide content.

A first outlet 24 of the purification unit 22 is connected to the cryogenic unit 14, which includes a return line 26 provided with a heater 27, the line 26 returning to the purification line, and a second outlet 28 of the purification unit 22 is connected to the unit 16 so as to deliver the feed gas for this unit 16.

The purification unit 22 comprises two adsorbent bottles 22A, 22B placed in line alternately, in order to ensure purification, by temperature swing adsorption, of the gas mixture leaving the amine-scrubbing unit 20, the adsorption of water and carbon dioxide taking place when cold and the desorption of these components taking place when hot.

The unit 16 comprises six adsorbers R1 to R6, each having an adsorbent material suitable for adsorptively fixing impurities such as hydrocarbons and water contained in the feed gas of the line 28. Various types of adsorbent materials can be envisioned, such as activated carbons, silica gels and/or molecular sieves.

Figure 2:
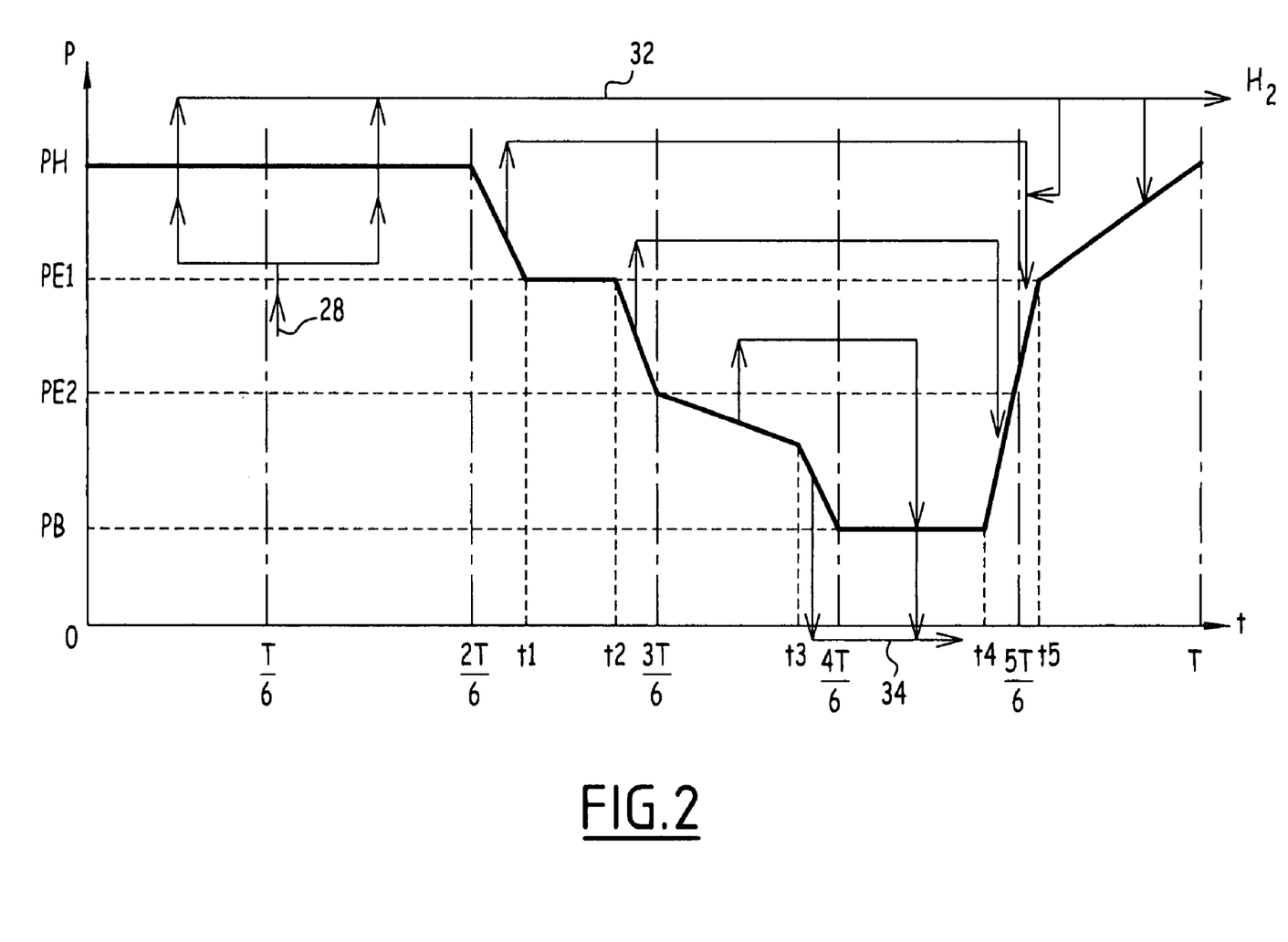
FIGS. 2 and 3 are operating diagrams of the PSA unit of FIG. 1.

The unit 16 is of the PSA type, that is to say a pressure swing adsorption unit. For this purpose, it comprises pipes and valves (not shown), and a control unit 30 that will be explained later, these being designed to make each adsorber R1 to R6 undergo a cycle of period T, consisting of six phase times of the same duration, and an example of which is shown in FIG. 2. Considering that the cycle shown applies from the time t=0 to t=T to the adsorber R6, the operation of the absorber R5 is deduced therefrom by a time shift of T/6, that of the adsorber R4 by a time shift of 2T/6, and so on until that of the adsorber R1 obtained by a time shift of 5T/6.

Owing to the phase time/adsorber duality, this amounts to considering that, in FIG. 2, the adsorber R6 undergoes the first time phase, shown between times t=0 and t=T/6, the adsorber R5 undergoes the second phase time, shown between the times t=T/6 and t=2T/6, and so on until the adsorber R1, which undergoes the sixth phase time, shown between the times t=5T/6 and t=T.

In FIG. 2, the times t are plotted on the x-axis and the absolute pressures P on the y-axis, the straight lines shown by the arrows indicate the movements and destinations of the gas streams, and, in addition, the direction of flow in the adsorbers R1 to R6: when an arrow is in the direction of increasing y values (upward in the diagram), the stream is referred to as a cocurrent stream in the adsorber; if the upwardly directed arrow lies below the line indicating the pressure in the adsorber, the stream enters the adsorber via the inlet end of this adsorber while if the upwardly directly arrows lines above the line indicating the pressure, the stream leaves the adsorber via the outlet end of the adsorber, the inlet and outlet ends being those respectively for the gas to be treated and for the gas withdrawn as production. When an arrow is in the direction of decreasing y values (downward in the diagram), the stream is said to be a countercurrent stream in the adsorber; if the downwardly directed arrow lies below the line indicating the pressure of the adsorber, the stream leaves the adsorber via the inlet end of this adsorber while if the downwardly directed arrow lies above the line indicating the pressure, the stream enters the adsorber via the outlet end of this adsorber, the inlet and outlet ends again being those for the gas to be treated and for the gas withdrawn as production. The inlet end of the adsorbers is their lower end.

Thus, again considering that the cycle shown in FIG. 2 applies from the time t=0 to t=T to the adsorber R6, this cycle includes an adsorption phase from t=0 to t=2T/6 and a regeneration phase from t=2T/6 to t=T.

Throughout the following text, the pressures are given in bar absolute.

More precisely, during the adsorption phase, the feed gas conveyed via the line 28 enters the adsorber at a high adsorption pressure, denoted HP, of about 20 bar. A stream of substantially pure hydrogen is then withdrawn as overhead, at the same pressure, and part of it supplies a hydrogen production line 32, the remainder being sent to another adsorber, one undergoing a repressurization step described later.

The regeneration phase comprises, from t=2T/6 to t=4T/6:

from t=2T/6 to t=t1, t1 being less than 3T/6, a cocurrent first depressurization step during which the outlet of the adsorber R6 is connected to that of another adsorber in a repressurization step described later, until the pressures in the two adsorbers are balanced at a first balancing pressure, denoted BP1;

from t1 to t=t2, t2 being less than 3T/6, a holding step during which no stream flows through the adsorber, its pressure remaining substantially equal to the first balancing pressure BP1;

from t2 to t=3T/6, a cocurrent second depressurization step during which the stream flowing cocurrently from the adsorber R6 is sent to the outlet of another adsorber at the start of the repressurization step, described later, until the pressures of the two adsorbers are balanced to a second balancing pressure BP2;

from t=3T/6 to t=t3, t3 being less than 4T/6, a cocurrent third depressurization step during which the cocurrent stream leaving the adsorber is decompressed and sent to the outlet of an adsorber undergoing the elution step described later; and from t3 to t=4T/6, a countercurrent depressurization step, commonly called a purge step, during which the stream leaving the adsorber R6 is sent to a waste line 34, connected as output to the reactor 18; this step continues down to the low pressure of the cycle, denoted by LP, of about 1.6 bar.

The regeneration phase then comprises, from t=4T/6 to t=t4, an elution step during which the adsorbent material is countercurrently purged by an elution gas formed from the gas coming from the adsorber in the cocurrent third depressurization step, so as to desorb practically all of the impurities previously adsorbed. The stream leaving the adsorber then forms a waste gas at the low pressure LP and is sent into the line 34.

Finally, the regeneration phase comprises:

from t4 to t=5T/6, a countercurrent first repressurization step during which the adsorber receives the stream coming from the adsorber in the cocurrent second depressurization step, up to the second balancing pressure BP2;

from t=5T/6 to t=t5, a countercurrent second repressurization step, during which the adsorber receives both a portion of the streams coming from the adsorbers in adsorption phase and the stream coming from the adsorber in the cocurrent first depressurization step, until the pressure reaches the first balancing pressure BP1; and from t=t5 to t=T, a countercurrent third repressurization step during which the adsorber receives only a portion of the streams coming from the adsorbers in adsorption phase, until the pressure of the adsorber reaches the high pressure HP of the cycle.

The cycle shown in FIG. 2, that has just been described in detail, is commonly called a "6.2.2 cycle" using the notation convention "X.Y.Z cycle" whereby X corresponds to the total number of adsorbers in operation, Y corresponds to the number of adsorbers in adsorption phase and Z corresponds to the number of pressure balancing steps.

The PSA unit 16 is controlled by the control unit 30, which sends to it the various signals for controlling the valves of the PSA unit so as to make the six adsorbers R1 to R6 follow an operating cycle as described above.

The unit 30 is provided with a memory 36 and possesses not only the parameters of the cycle of FIG. 2 described above but also the parameters of other operating cycles, as will be explained later. The memory 36 is connected to the unit 30 via a data transmission line 38.

The overall operation of the plant 10 is as follows.

In the steady state, that is to say outside the startup or shutdown periods of the plant, the reactor 18 is fed with natural gas and with water, and produces a gas mixture rich in hydrogen, carbon monoxide and carbon dioxide, which also contains methane, nitrogen, water and traces of heavy hydrocarbons.

By being scrubbed with amines in the unit 20, the stream conveyed to the outlet of this unit 20 has both a high hydrogen content and a high carbon monoxide content. An example of the data relating to this gas is summarized in the table below.

| Dry composition (in vol %) | $H_2$ | 73.35 |
| --- | --- | --- |
| | $N_2$ | 0.74 |
| | CO | 19.31 |
| | $CO_2$ | 0.01 |
| | $CH_4$ | 6.59 |
| Flow rate ($Sm^3/h$) | | 38 000 |
| Pressure (bar abs.) | | 23.8 |
| Temperature (° C.) | | 35 |

This stream is sent to the purification unit 22 and then to the cryogenic unit 14, which produces a stream of substantially pure carbon monoxide, discharging into the line 26 a hydrogen-rich gas mixture used for the regeneration in succession of one of the bottles and then the other, 22A and 22B, of the purification unit.

The stream output from the bottle 22A, 22B in the regeneration mode is sent into the line 28, which continuously conveys this stream to the PSA unit 16. An example of the data relating to this gas stream is summarized in the table below:

| Dry composition (in vol %) | $H_2$ | 98.01 |
| --- | --- | --- |
| | $N_2$ | 0.17 |
| | CO | 0.31 |
| | $CO_2$ | 0.01 |
| | $CH_4$ | 1.51 |
| Flow rate ($Sm^3/h$) | | 26 500 |
| Pressure (bar abs.) | | 21.3 |
| Temperature (° C.) | | 30 |

The operation of the PSA unit 16 is set by the control unit 30, by making the adsorbers R1 to R6 undergo the 6.2.2 cycle of FIG. 2, which constitutes a nominal cycle for the operating conditions detailed above, and for the performance levels considered as optimum as regards the following material budget:

| | | Product gas at 32 | Waste gas at 34 |
| --- | --- | --- | --- |
| Dry composition (in vol %) | $H_2$ | 100 | 88.03 |
| | $N_2$ | 0 | 1.02 |
| | CO | 0 | 1.86 |
| | $CO_2$ | 0 | 0.06 |
| | $CH_4$ | 0 | 9.04 |
| Flow rate ($Sm^3/h$) | | 22 075 | 4 425 |
| Pressure (bar abs.) | | 20.6 | 1.35 |
| Temperature (° C.) | | 30 | 30 |

That which has been described above corresponds to what is called a nominal operation of the plant 10.

However, in the event of failures or difficulties in operating the purification unit 22 and/or the cryogenic unit 14, it is necessary, in order to maintain a hydrogen production stream at 32, to send the stream coming from the amine-scrubbing unit 20 directly to the PSA unit 16, via a bypass line 40 shown by the dotted lines in FIG. 1.

The treatment of the gas coming from the unit 20 by the unit 16, which would continue to undergo the 622 cycle of FIG. 2, would come up against two main limitations:

a quantity of impurities to be arrested that is much higher than previously during the adsorption phase with the same volume of adsorbent; and a volume of waste gas to be discharged that is much higher than previously during the purge and elution steps.

This latter constraint results, conventionally, in the regeneration steps being extended in order to maintain the flow rates and pressure drops that are compatible with correct operation of the PSA unit. In general, using conventional methods of regulation such as those mentioned in the preamble, it is necessary to increase the number of cycles per hour (by reducing the phase time), and thus to treat less gas per phase in order to prevent the production from being polluted with the impurities. Furthermore, owing to the fact that the hydrogen content in the gas at 40 is much lower than the nominal hydrogen content of the gas at 28, the hydrogen production that it is possible to obtain with the PSA unit 16 under a 6.2.2 cycle, treating the gas coming from the amine-scrubbing unit 20 directly, is substantially lower than the nominal production explained above.

The use of an auxiliary cycle, considerably different from the nominal cycle, proves to be advantageous for maintaining acceptable performance levels in terms of yield, purity and/or productivity as regards the gas produced by the PSA unit. According to the invention, such a cycle is preprogrammed beforehand and stored in the memory 36 in order to be able to be transmitted, via the line 38, to the unit 16 as soon as its operating conditions depart substantially from the nominal conditions, at the point when the minimum performance levels required are no longer achieved.

Figure 3:
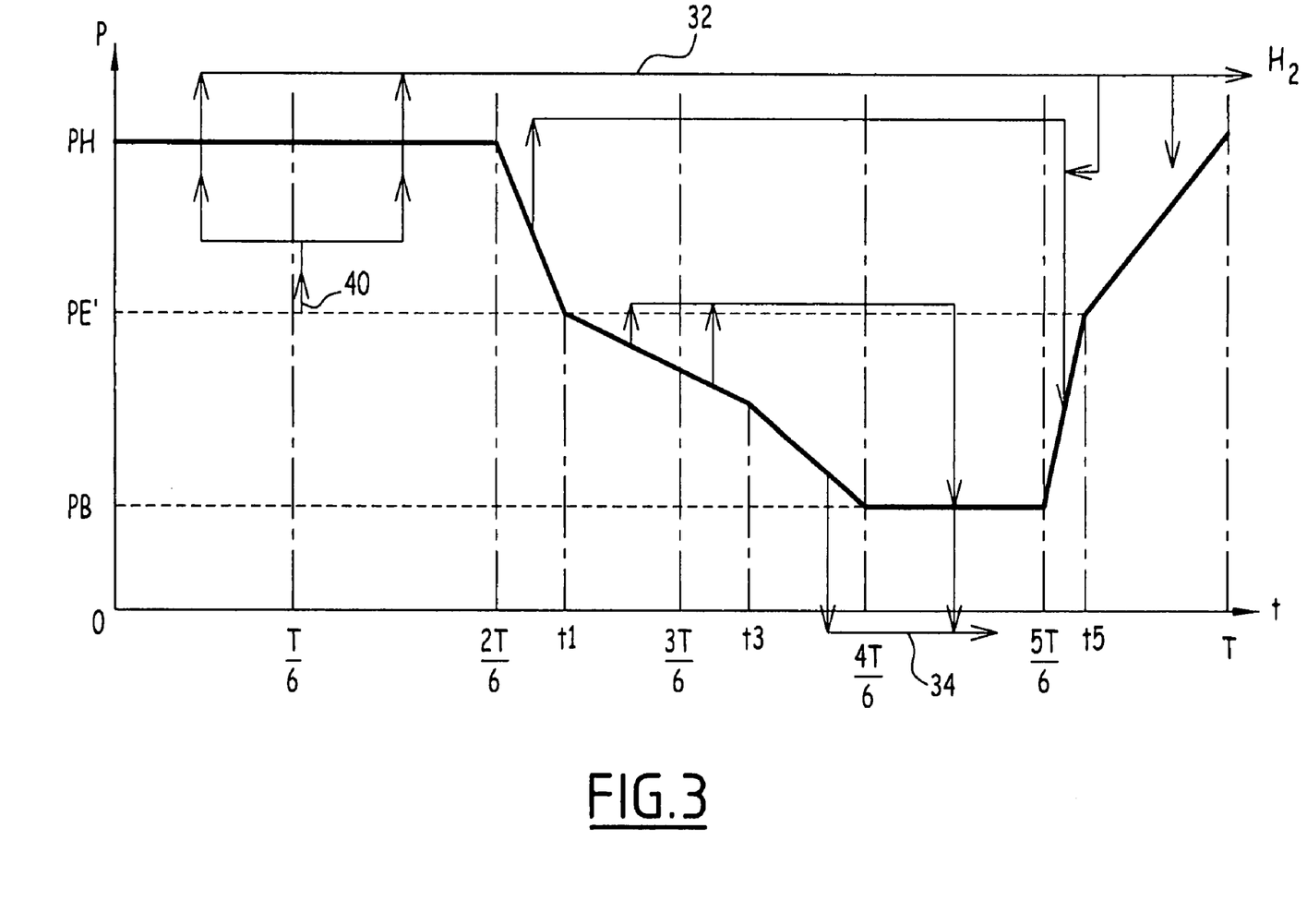

An example of such a preprogrammed cycle is shown in FIG. 3 and corresponds to a type 6.2.1 cycle, that is to say comprising six adsorbers, two of which are in production, but having a single pressure balancing step (at a pressure denoted by BP').

Since the notation and representation conventions of the cycle shown in FIG. 3 are identical to those of the cycle of FIG. 2, the 6.2.1 cycle will not be explained further.

The fact of omitting, compared with the 6.2.2 cycle of FIG. 2, one balancing step results in a reduction in the hydrogen extraction efficiency but does allow substantially more feed gas to be treated per phase.

Comparing the diagrams of the 6.2.2 and 6.2.1 cycles also shows that the latter cycle makes it possible, with phase times unchanged, to have more time for the purge and elution steps.

Under these conditions, it is possible to produce more than 70% of the nominal production. One example of a material budget, using 28 000 Sm³/h of the 38 000 Sm³/h available at 40, is the following:

|  |  | Gas at 40 | Product gas at 32 | Waste gas at 34 |
|---|---|---|---|---|
| Dry composition (in vol %) | H₂ | 73.35 | 100 | 38.76 |
|  | N₂ | 0.74 | 0 | 1.70 |
|  | CO | 19.31 | 0 | 44.37 |
|  | CO₂ | 0.01 | 0 | 0.02 |
|  | CH₄ | 6.59 | 0 | 15.14 |

-continued

|  | Gas at 40 | Product gas at 32 | Waste gas at 34 |
|---|---|---|---|
| Flow rate (Sm³/h) | 28 000 | 15 814 | 12 186 |
| Pressure (bar abs.) | 23.8 | 20.6 | 1.35 |
| Temperature (° C.) | 35 | 35 | 35 |

As a variant (not shown), owing to the extension of the purge and elution steps as a result of the change in cycle, it is possible to reduce the phase time while still keeping a sufficient duration for these steps. This arrangement makes it possible to carry out more cycles per hour and therefore to produce more hydrogen, to the detriment of about 1% in efficiency.

Conversely, it may be required, in auxiliary operation, to produce a given amount of hydrogen that is substantially less than the nominal amount, but using the minimum of feed gas. In this case, a 6.1.3 cycle with a single adsorber in production phase and three balancing steps is an advantageous solution.

More generally, the method according to the invention consists, for example, in switching from the nominal X.Y.Z cycle to an auxiliary X'.Y'.Z' cycle with at least one of the numbers X', Y' and Z' differing from the respective numbers X, Y and Z.

By comparing the reduced operation cases with the exceptional operation cases, in which it is common practice to make the PSA unit operate in a cycle close to its nominal cycle by means of the regulations mentioned in the preamble, the method according to the invention is based on the notion that, when the changes in feed are frequent, or of sufficiently long duration, it is desirable to take into account the various operating conditions by preprogramming, in advance, and by storing the corresponding cycles that it is anticipated will have to be used.

With a PSA unit having such preprogrammed cycles, for example those designed right from the installation of this unit, the PSA unit is capable of operating under diverse operating conditions, by means of pipework and valve arrangements for bypassing all or some of the lines upstream of the PSA unit in question. The memory 36 advantageously includes control instructions for switching from one cycle to another, making the PSA unit 16 undergo intermediate transition steps.

Other situations, which substantially modify the operating conditions of the PSA unit, are conceivable. For example, during the maintenance of all or some of the parts upstream of the PSA unit, the feed gas is delivered by a secondary source with a flow rate of less than the nominal flow rate.

Likewise, the method according to the invention is particularly advantageous during periodic requirements for a production overcapacity, since a reduction in the number of balancing steps, if necessary in conjunction with a reduction in the phase time, allows the production to be increased by increasing the feed flow rate, for example with an additional source of feed gas.

It should be noted that this notion of balancing reduction is not limited to the case of complete pressure balancing steps, such as those of the 6.2.2 and 6.2.1 cycles explained in detail in FIGS. 2 and 3. This is because it is possible to stop a pressure balancing step before pressure equalization between the adsorbers connected to each other has actually been carried out; this is then referred to as partial balancing, and no longer of a balancing number but a balancing fraction. For example, in the event of a complete balancing step, the high pressure HP of the cycle passes in succession to the intermediate pressure BP1, in the case of a complete first balancing step, then to the pressure BP2, in the case of a complete second balancing step, and if the pressure of the second balancing step is stopped at a value BP2' above the value BP2, the balancing fraction carried out is equal to $$1 + \frac{PE1 - PE2'}{PE1 - PE2},$$

for example equal to 1.5 balancing steps. In other words, the numbers Z and Z' are not necessarily integers.

Another example of application of the method according to the invention relates to refinery gas purification. Within a refinery, there are several hydrogen sources (catalytic reactor, impure hydrogen network, fuel oil network, etc.) that may undergo hydrogen purification by PSA. These gas streams are generally composed of hydrogen, hydrogen sulfides, saturated and unsaturated hydrocarbons, aromatic hydrocarbons, water, nitrogen, etc. The treatment of these gases requires the use of specific adsorbents and allows good pressure regeneration of the heaviest compounds. Once this adsorbent has been chosen and placed in the bottom of the adsorbers, it is possible for the PSA unit to treat practically all the hydrogen-containing gases output by a refinery.

It is therefore considered to be judicious to replace the nominal cycle of the PSA unit with a preprogrammed auxiliary cycle, depending on the operating conditions of the unit. Thus, a feed gas at high pressure and rich in hydrogen (with an $H_2$ content of greater than 90%) is treated using a cycle different from that used for a low-pressure or medium-pressure gas with a hydrogen content of around 60%.

More generally, the more hydrogen-rich a gas is, the longer the adsorption production phase, compared with the regeneration phase, of the cycle chosen from among the preprogrammed cycles, and vice versa. It is thus advantageous to preprogram an entire range of PSA cycles possessing (duration of the adsorption phase)/(duration of the purge and elution steps) ratios of between 0.5 and 2.

The invention claimed is:

1. A method for treating at least one feed gas by adsorption, of the type in which a pressure swing adsorption treatment unit is used and in which said treatment unit is made to follow a nominal operating cycle defined according to nominal operating conditions and for the purpose of guaranteeing minimum feed gas treatment performance levels, wherein:
   a) at least one preprogrammed auxiliary operating cycle, different from the nominal cycle, is used;
   b) when the operating conditions differ from the nominal conditions to the point that the treatment unit no longer achieves its minimum performance levels, the treatment unit is made to follow the at least one auxiliary cycle;
   c) the nominal operating cycle is identified by a triplet X.Y.Z, where X denotes the number of active adsorbers of the treatment unit, Y denotes the number of adsorbers in simultaneous adsorption and Z denotes the number of pressure balancing steps carried out on said nominal cycle; and
   d) at least one of the number X' of active adsorbers, of the number Y' of adsorbers in simultaneous adsorption and of the number Z' of pressure balancing steps carried out on each of the at least one auxiliary cycles is different from the corresponding number of the nominal cycle.

2. The method of claim 1, wherein the composition of the feed gas is an operating condition.

3. The method of claim 1, wherein the pressure of the feed gas and the pressure of a waste gas output by the treatment unit are operating conditions.

4. The method of claim 1, wherein the temperature of the feed gas is an operating condition.

5. The method of claim 1, wherein the flow rate of the feed gas is an operating condition.

6. The method of claim 1, wherein preprogrammed intermediate steps are used for passing from one cycle to the other from among the nominal cycles and auxiliary cycle(s).

7. The method of claim 1, wherein at least one of the pressure balancing steps is a partial balancing step so that at least one of the numbers Z and Z' is not an integer.

8. The method of claim 1, wherein the nominal cycle and each of the at least one auxiliary cycles include the following steps:
   a) at least one adsorption step at a high pressure (HP) of the cycle;
   b) a purge step consisting of a countercurrent depressurization down to the low pressure (LP) of the cycle;
   c) an elution step at said low pressure; and
   d) a repressurization step up to said high pressure, the (duration of the adsorption phase)/(duration of the purge and elution steps) ratio being substantially between 0.5 and 2 for each of the cycles.

9. The method of claim 1, wherein the treatment unit is a hydrogen production unit.

10. A combined hydrogen/carbon monoxide production plant comprising:
   a) at least one reactor for the production of a syngas;
   b) at least one unit for the decarbonization of the syngas;
   c) at least one unit for the purification of the decarbonized gas;
   d) at least one cryogenic unit for the production of carbon monoxide, connected to one outlet of the purification unit; and
   e) at least one unit for treatment by pressure swing adsorption, connected to another outlet of the purification unit,
   wherein said pressure swing adsorption treatment unit is capable of implementing the method as defined in one of claim 1.

11. The plant of claim 10, wherein said plant includes a natural gas treatment line, downstream of which both a cryogenic unit for production of carbon monoxide (CO) and a unit for production of hydrogen ($H_2$) are connected;
   wherein the treatment line comprises, from upstream to downstream:
      i) a syngas production reactor, in which the natural gas is desulfurized, heavy hydrocarbons are decomposed into methane and carbon dioxide, and the methane is converted into a hydrogen-rich syngas containing carbon monoxide and carbon dioxide;
      ii) an amine-scrubbing decarbonization unit, a carbon dioxide-rich waste stream of which is recompressed at and recycled upstream of the reactor; and
      iii) purification unit for arresting almost all of the water and greatly lowering the carbon dioxide content;
   wherein a first outlet of the purification unit is connected to the cryogenic unit, which includes a return line provided with a heater, the line returning to the purification line, and a second outlet of the purification unit is connected to the unit so as to deliver the feed gas for this unit;

wherein the purification unit comprises two adsorbent bottles, placed in line alternately in order to ensure purification by temperature swing adsorption of the gas mixture, leaving the amine-scrubbing unit, the adsorption of water and carbon dioxide taking place when cold, and the desorption of these components taking place when hot; and wherein the unit comprises six adsorbers, each having an adsorbent material suitable for adsorptively fixing impurities such as hydrocarbons and water contained in the feed gas of the line.

* * * * *